United States Patent Office 3,486,043
Patented Dec. 23, 1969

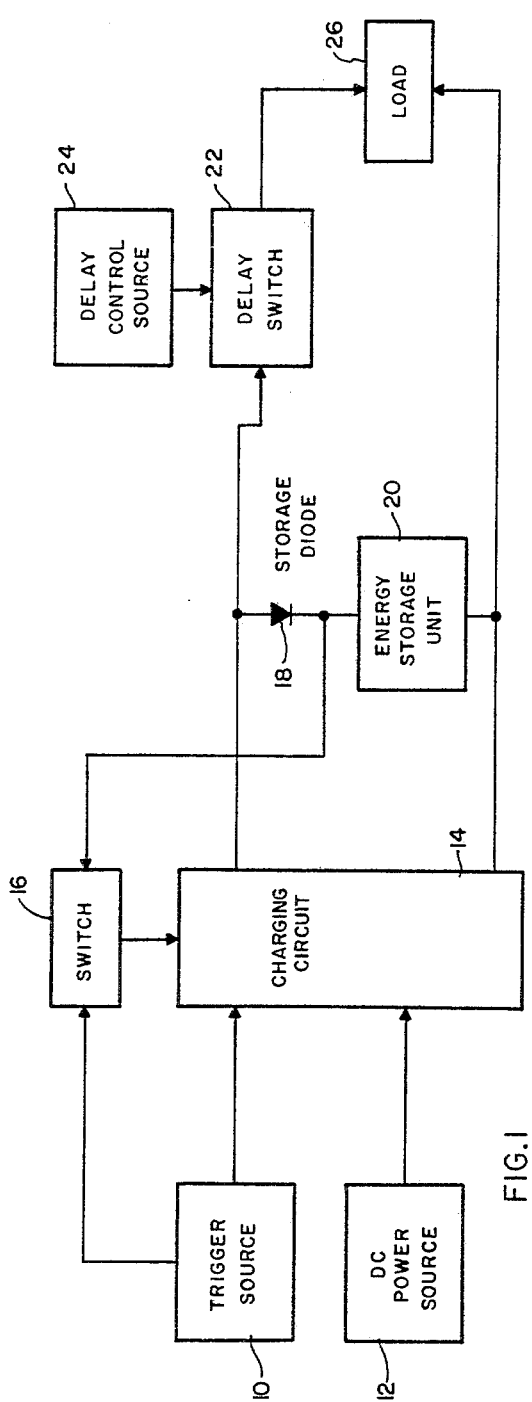
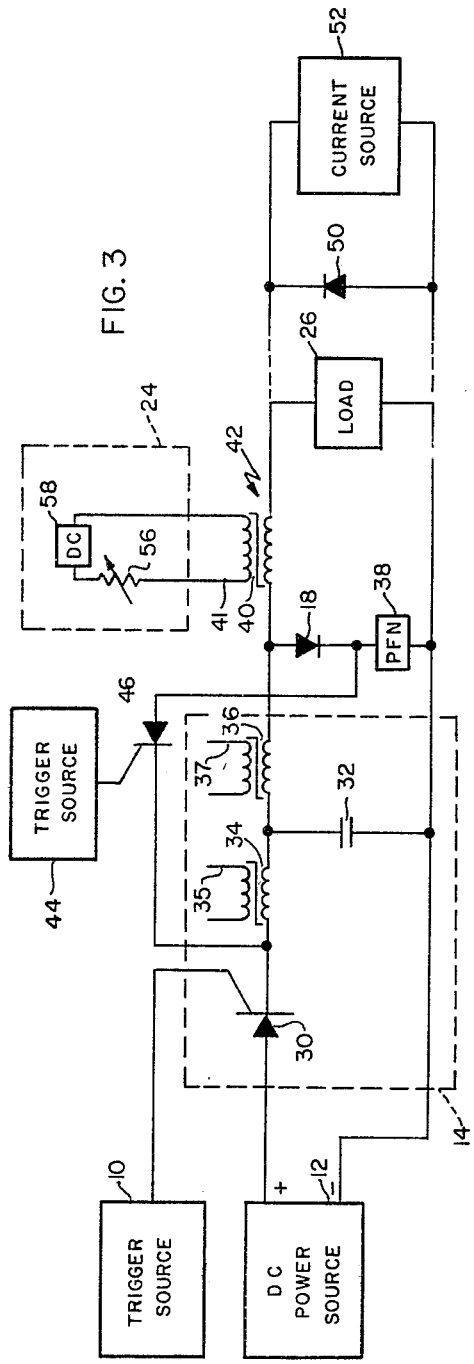

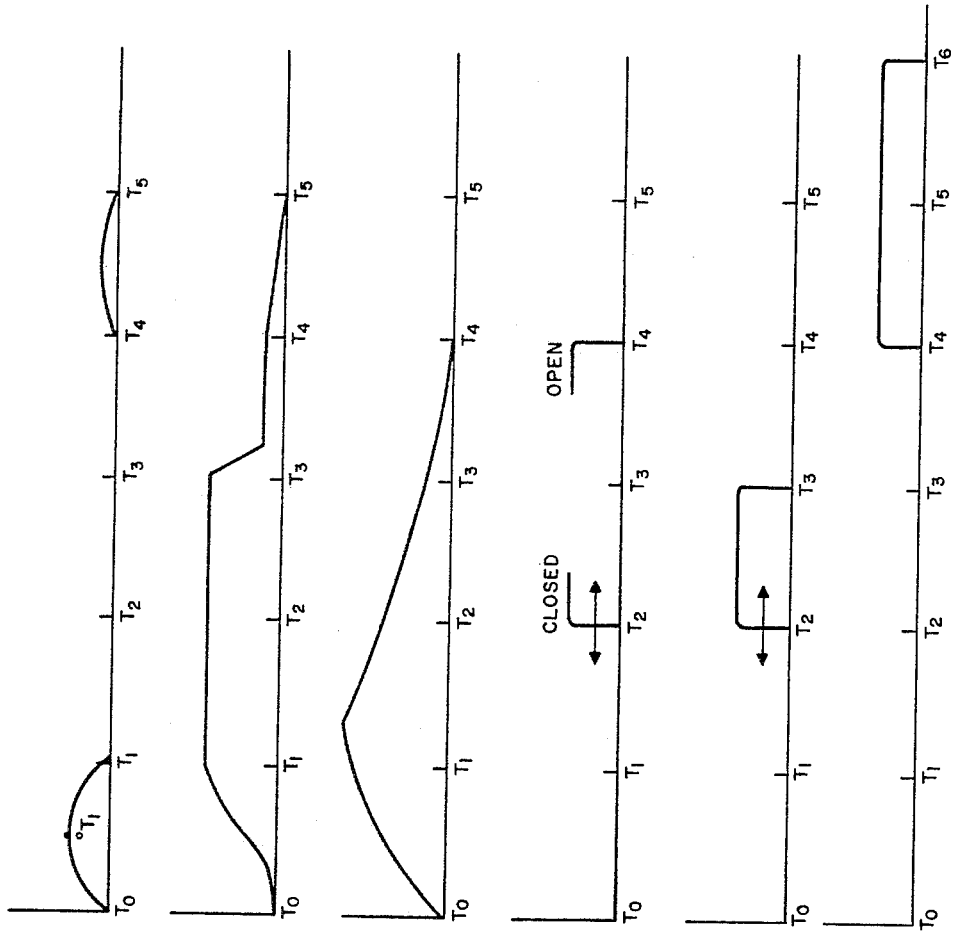

3,486,043
HIGH POWER PULSE WIDTH MODULATOR
EMPLOYING STEP RECOVERY DIODES
Paul R. Johannessen, Lexington, Mass., assignor to Sylvania Electric Products Inc., a corporation of Delaware
Filed Dec. 12, 1966, Ser. No. 601,100
Int. Cl. H03k 7/08
U.S. Cl. 307—265                                    6 Claims

ABSTRACT OF THE DISCLOSURE

A pulse width modulator employing a single power supply and a storage diode having step recovery characteristics. In response to a trigger signal, energy is directed from the power supply through the storage diode to an energy storage means. The charging portion of the circuit is then disconnected, and recombination occurs within the storage diode. At a predetermined time after the start of recombination, the storage diode and the energy storage means are connected in series with a load. At the end of the recombination period, the storage diode changes impedance interrupting the transfer of energy from the storage means to the load. Pulse width modulation is achieved by varying the predetermined time before the load is connected to the storage means via the storage diode.

---

This invention relates to pulse circuits and in particular to high power pulse modulators which employ storage diodes with step recovery characteristics for pulse shaping and pulse width modulation.

High power pulse modulators used, for example, in radar systems usually employ either line type modulators or the hard tube type. Line type modulators generally employ gas discharge tubes, controlled rectifiers or saturable reactors as a switch to discharge a high energy source through a load to thereby generate high power pulses. However, gas discharge tubes or controlled rectifiers cannot be turned off while passing forward current, and pulse width modulation is not possible as the total stored energy is discharged into the load. Hard tube modulators, for example a chain of high power vacuum tube amplifiers, can be gated so that only part of the stored energy is discharged into a load to achieve pulse width modulation, but such vacuum tubes are inefficient and are physically large and heavy. It would be advantageous to have, and it is an object of this invention to provide, a light weight, highly efficient circuit for modulating and shaping high power pulses.

This invention makes use of the phenomenon of minority carrier charge in a semiconductor diode whose majority carrier charge distribution generates a retarded field that tends to confine the minority carriers near the network or delay line, in series with the storage diode.

The invention will be more fully described in the following detailed description, taken in conjunction with the drawings in which:

FIG. 1 is a block diagram of a pulse width modulator according to the invention;
FIGS. 2A–2F are timing diagrams useful in explaining the operation of FIG. 1; and
FIG. 3 is a schematic diagram of a pulse width modulator according to the invention.

The circuit concept of the invention is shown in FIG. 1 and comprises a trigger source 10, which initiates a charging cycle whereby a charging circuit 14 takes energy from a DC power source 12 and passes it through a storage diode 18 to an energy storage unit 20. Charging circuit 14 is then disconnected and recombination occurs within the storage diode 18. At a specified time after the start of recombination, a delay control signal from source 24 closes a delay switch 22, connecting the serial combination of the storage diode 18 and energy storage unit 20 in series with a load 26 to generate the leading edge of the output pulse. At the end of the recombination period, storage diode 18 rapidly changes impedance interrupting the transfer of energy between the energy storage unit 20 and the load 26 thereby generating the trailing edge of the output pulse. Pulse width modulation is achieved by varying the time at which delay switch 22 is closed.

One circuit embodiment of the block diagram of FIG. 1 is shown in FIG. 3. The charging circuit 14 includes a DC power source 12, a controlled rectifier 30 in series with a pair of saturable reactors 34 and 36, and a capacitor 32 connected between the common junction of the reactors and the negative terminal of source 12. The charging circuit 14 employs resonance charging and magnetic pulse compression. Reactors 34 and 36 are initially biased, respectively, in their saturated and unsaturated state via respective bias windings 35 and 37 which are connected to a suitable bias source (not shown). Storage diode 18 is connected in series with a pulse forming network (PFN) 38 between one terminal of reactor 36 and the negative line of power source 12. The pulse width modulating circuitry 42 includes a reactor 40 connected between the anode of diode 18 and load 16, with the bias supply 41 connected to delay control source 24. Any charge remaining in storage unit 20 is returned to charging circuit 14 by activating a switch 16 after the recombination period has ended.

The operating sequence of the circuit of FIG. 1 is best explained with reference to the timing diagram of FIGS. 2A–2F. $T_0$ represents the time current starts flowing from charging circuit 14 to energy storage unit 20. FIG. 2A depicts the charging circuit current and FIG. 2B depicts the resulting voltage across the storage element. At time $T_1$, charging circuit 14 is disconnected from the storage diode and recombination occurs in the diode junction as shown in FIG. 2C. At time $T_2$, delay switch 22 is closed, connecting the energy storage unit to the load 26 through diode 18. FIG. 2E shows the output pulse at the load 26. At time $T_3$, the storage diode 18 recovers and thus terminates the output pulse. At $T_4$, switch 16 is closed, returning the remaining charge in the energy storage unit to charging circuit 14 to be used in the next charging cycle. The efficiency of the circuit is enhanced by using this remanent charge for the generation of the next pulse.

In operation, trigger source 10 supplies a signal to the control electrode of controlled rectifier 30, causing it to conduct and allowing source 12 to charge capacitor 32 through saturable reactor 34, which is then driven into the unsaturated state. When capacitor 32 is fully charged, saturable reactor 36 saturates, transferring the charge to pulse forming network (PFN) 38 via storage diode 18 and causing minority carriers to be established in the junction of diode 18. When the charging of the pulse forming network is completed, reactor 36 is in its high impedance state thereby isolating the charging circuit from the modulating circuit 42. Recombination begins to occur in the diode junction and, during this recombination period, the voltage on the PFN is applied across the saturable reactor 40 driving it toward saturation. The time required to saturate reactor 40 depends upon the magnitude of the bias current in winding 41. Upon saturation of reactor 40, diode 18 and PFN 38 are connected across the load 26. PFN 38 discharges through the load generating an output pulse of a width determined by the time during the recombination period at which the reactor 40 saturates. The output pulse terminates when the charge in the diode 18 is depleted, at which time diode 18 becomes essentially an open circuit. At some time after the generation of the output pulse, controlled rectifier 46 is rendered conductive, by the application of a control signal from trigger source 44, allowing the charge remaining in PFN 38 to be transferred to capacitor 32 via reactor 34. In this manner, capacitor 32 is partially charged to expedite the subsequent charging cycle.

The bias current in control winding 41 is varied to control the width of the generated pulses by a suitable variable source 24 which can be, for example, a direct current source 58 and a variable resistor 56. A particular control signal determines the saturation time of reactor 40 which, in turn, determines the time at which PFN 38 discharges into the load to generate a pulse whose width is related to the saturation time. The pulse width is varied, therefore, by adjusting the magnitude of the control signal applied to reactor 40. This control signal can be programmed by well known means to vary the pulse width on a pulse by pulse basis, as in radar applications.

In the circuits described thus far, the storage diode 18 step recovery characteristics shape the trailing edge of the output pulses due to fast turn off time of the diode. The rise time or leading edge of the pulse is determined by the high frequency characteristic of pulse forming network 38. By use of a second storage diode 50 having step recovery characteristics and a current source 52 both connected in parallel with the load 26, the leading edge can also be shaped by the fast turn off time of storage diode 50. When reactor 40 saturates, current flows through the second storage diode 50 due to the low impedance caused by the presence of minority carrier charge injected by the current source 52. The diode 50 in effect shorts out the load 26 until the minority carrier charge has been depleted and then transfers the current to the load 26 at the turn off rate of the diode 50. Thus, the step recovery characteristic of the storage diode 50 shapes the leading edge of the voltage waveform at the load 26.

The invention is not limited to the specific embodiments and modifications shown and described herein but embraces the full scope of the following claims.

What is claimed is:

1. A high power pulse width modulator comprising an energy storage means, a semiconductor storage diode having step recovery characteristics serially connected to said storage means, a direct current voltage source, a charging circuit having its input connected to said voltage source and its output connected to said series-connected diode and energy storage means, a load, and first switch means operative to connect said diode and storage means in series with said load at a specified time during the diode recombination period.

2. A high power pulse width modulator according to claim 1 further including a second switching means operative to return residual energy from said energy storage means to said charging circuit.

3. A high power pulse width modulator according to claim 2 wherein said energy storage means is a pulse forming network and wherein said charging circuit comprises a series combination of a first saturable reactor and a capacitor, a third switching means operative to transfer energy from said voltage source to said first saturable reactor and capacitor, and a second saturable reactor operative to transfer energy from said capacitor to said series connected diode and energy storage means.

4. A high power pulse width modulator according to claim 3 wherein said first switching means comprises a source of delay control signals operative to generate a variable delay signal within the recombination time of said storage diode, and a delay switch operative in response to said variable delay signals to connect said series connected diode and energy storage means to said load.

5. A high power pulse width modulator according to claim 4 wherein said source of delay control signals includes a direct current source and a variable resistor operative to control the current in the control winding of said second saturable reactor.

6. A high power pulse width modulator circuit according to claim 4 further including a series connected second storage diode having step recovery characteristics and a current source operative to transfer said energy to said load at the step recovery rate.

References Cited

UNITED STATES PATENTS

| | | | |
|---|---|---|---|
| 3,099,754 | 7/1963 | Jones et al. | 307—252 |
| 3,139,585 | 6/1964 | Ross et al. | 328—67 X |
| 3,184,605 | 5/1965 | Herzog | 307—265 |
| 3,296,551 | 1/1967 | Staples | 328—67 X |
| 3,328,703 | 6/1967 | Lee | 328—67 X |
| 3,363,184 | 1/1968 | Smith | 328—67 X |

DONALD D. FORRER, Primary Examiner

S. D. MILLER, Assistant Examiner

U.S. Cl. X.R.

307—281, 319; 328—67, 65